United States Patent
Nicolas et al.

(10) Patent No.: US 12,385,798 B2
(45) Date of Patent: Aug. 12, 2025

(54) INTEGRATED METHANE MONITORING SYSTEM

(71) Applicant: Schlumberger Technology Corporation, Sugar Land, TX (US)

(72) Inventors: Vincent Nicolas, Missouri City, TX (US); Raphael M. Gadot, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/667,261

(22) Filed: May 17, 2024

(65) Prior Publication Data
US 2024/0385068 A1 Nov. 21, 2024

Related U.S. Application Data (60) Provisional application No. 63/503,289, filed on May 19, 2023.

(51) Int. Cl.
*G01M 3/04* (2006.01)

(52) U.S. Cl.
CPC .................... *G01M 3/04* (2013.01)

(58) Field of Classification Search
CPC ........... G01M 3/04; G01M 3/002; G01M 3/38
See application file for complete search history.

(56) References Cited

U.S. PATENT DOCUMENTS

| | | | | |
|---|---|---|---|---|
| 6,813,563 B1 * | 11/2004 | Bradley | ................ | G01D 9/005 |
| | | | | 702/3 |
| 2003/0079553 A1 * | 5/2003 | Cain | .................... | G01M 3/002 |
| | | | | 73/861.27 |
| 2021/0247369 A1 | 8/2021 | Nottrott | | |
| 2022/0205964 A1 * | 6/2022 | Conley | ................ | G01M 3/007 |
| 2025/0020621 A1 | 1/2025 | Gadot | | |

FOREIGN PATENT DOCUMENTS

| | | | |
|---|---|---|---|
| CA | 2894391 A1 * | 6/2014 | ............. G01W 1/02 |
| CN | 212321573 U | 1/2021 | |
| JP | 2022029818 A | 2/2022 | |
| WO | 2022192247 A1 | 9/2022 | |
| WO | 2023215173 A1 | 11/2023 | |

OTHER PUBLICATIONS

Sustainable Solutions for Greenhouse Gas Reduction, Qube Technologies, https://www.qubeiot.com/solution, Mar. 13, 2025, 10 pages.
Emissions Technologies, ChampionX, https://www.championx.com/products-and-solutions/emissions-technologies/, Mar. 13, 2025, 4 pages.
Search Report and Written Opinion of International Application No. PCT/US2024/029908 dated Sep. 3, 2024, 10 pages.

\* cited by examiner

*Primary Examiner* — David Z Huang
(74) *Attorney, Agent, or Firm* — Jeffrey D. Frantz (57) ABSTRACT

A system for detecting methane includes a body and a shaft extending from the body. The system also includes a wind sensor coupled to the shaft. The wind sensor is configured to measure a wind direction and a wind intensity. The system also includes a pyranometer coupled to the body. The pyranometer is configured to measure ambient light. The system also includes a methane sensor positioned on or in the body. The methane sensor is configured to measure a methane concentration in ambient air.

8 Claims, 7 Drawing Sheets

INTEGRATED METHANE MONITORING SYSTEM

CROSS-REFERENCE TO RELATED APPLICATIONS

This application claims priority to U.S. Provisional Patent Application No. 63/503,289, filed on May 19, 2023, which is incorporated by reference.

BACKGROUND

Methane emissions from the oil and gas industry are receiving intense scrutiny as part of the energy transition. A large portion of the methane emissions from upstream and downstream operations arises from a small number of emission events referred to as "super-emitters." Super-emitters occur from a variety of sites, and recent data suggest many super-emitter events are intermittent. Continuous monitoring using methane emissions detectors installed permanently at a site offers a way to identify, quantify, and repair intermittent emissions. However, installing emissions detectors across many diverse sites can be economically challenging.

Further, some methane monitoring systems may be autonomous, permitting continuous detection. However, these systems generally call for complex on-site installation to connect the methane sensing system to a power source. The current on-site installation may thus involve a complex logistical effort to transport the sub-system elements of the methane emissions detection system from the factory to the well site. Therefore, what is needed is an improved system and method for monitoring methane emissions.

SUMMARY

A system for detecting methane includes a body and a shaft extending from the body. The system also includes a wind sensor coupled to the shaft. The wind sensor is configured to measure a wind direction and a wind intensity. The system also includes a pyranometer coupled to the body. The pyranometer is configured to measure ambient light. The system also includes a methane sensor positioned on or in the body. The methane sensor is configured to measure a methane concentration in ambient air.

In another embodiment, the system includes a body having an upper axial end and a lower axial end. The upper axial end is at least partially curved. The upper axial end has a first portion and a second portion. The first portion extends farther axially than the second portion. The system also includes a shaft extending from the first portion of the upper axial end. A central longitudinal axis through the shaft is parallel to and positioned radially-outward from a central longitudinal axis through the body. The system also includes a wind sensor coupled to an end of the shaft. The wind sensor is configured to measure a wind direction and a wind intensity. A central longitudinal axis through the wind sensor is aligned with the central longitudinal axis through the shaft. The system also includes a pyranometer coupled to the second portion of the upper axial end. The pyranometer is positioned radially-outward from the central longitudinal axis through the body. The pyranometer is circumferentially-offset from the shaft with respect to the central longitudinal axis through the body. The pyranometer is configured to measure ambient light. The system also includes a methane sensor positioned on or in the body. The methane sensor is configured to measure a methane concentration in ambient air.

In another embodiment, the system includes a body having an upper axial end and a lower axial end. The upper axial end is at least partially curved. The upper axial end has a first portion and a second portion. The first portion extends farther axially than the second portion. The system also includes a shaft extending from the first portion of the upper axial end. A central longitudinal axis through the shaft is parallel to and positioned radially-outward from a central longitudinal axis through the body. The system also includes a wind sensor coupled to an end of the shaft. The wind sensor is configured to measure a wind direction and a wind intensity. A central longitudinal axis through the wind sensor is aligned with the central longitudinal axis through the shaft. The system also includes a pyranometer coupled to the second portion of the upper axial end. The pyranometer is positioned radially-outward from the central longitudinal axis through the body. The pyranometer is circumferentially-offset from the shaft with respect to the central longitudinal axis through the body. The pyranometer is positioned such that neither the shaft nor the wind sensor will cast a shadow from the sun onto the pyranometer at any time on any day of the year. The pyranometer is configured to measure ambient light. The ambient light includes solar radiation. The pyranometer includes polycarbonate. The pyranometer is substantially dome-shaped to reduce a cosine angle error of the ambient light due to a position of the sun. The system also includes a methane sensor positioned on or in the body. The methane sensor is configured to measure a methane concentration in ambient air. The system also includes a temperature sensor positioned on or in the body. The temperature sensor is configured to measure a temperature of the ambient air. The system also includes a pressure sensor positioned on or in the body. The pressure sensor is configured to measure an atmospheric pressure of the ambient air, which is used to determine a height of the system. The system also includes a humidity sensor positioned on or in the body. The humidity sensor is configured to measure a humidity of the ambient air. The system also includes an accelerometer positioned on or in the body. The accelerometer is configured to measure a tilt of the system. The system also includes a global positioning sensor (GPS) positioned on or in the body. The GPS is configured to measure a location of the system. The system also includes a magnetometer positioned on or in the body, wherein the magnetometer is configured to measure an orientation of the system.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
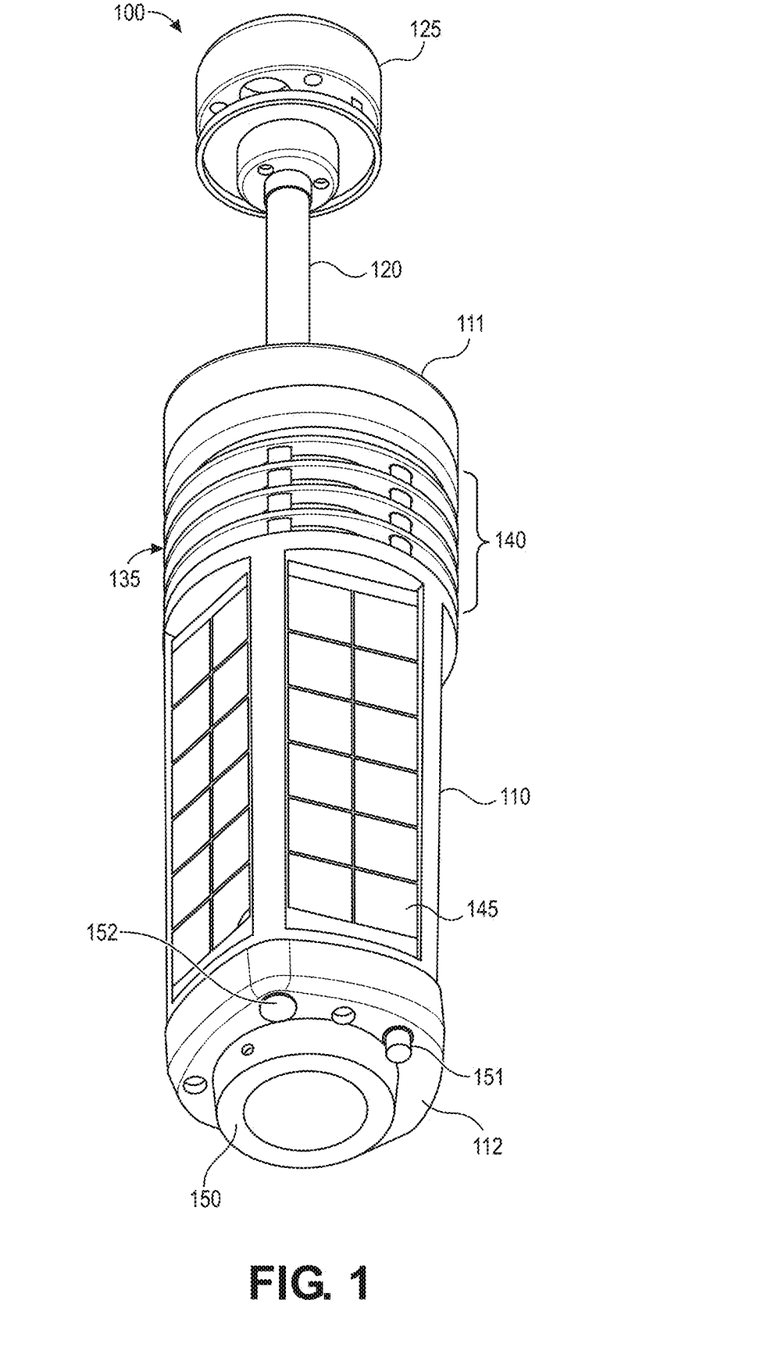
FIGS. 1-3 illustrate perspective views of a methane monitoring system, according to an embodiment.
Figure 2:
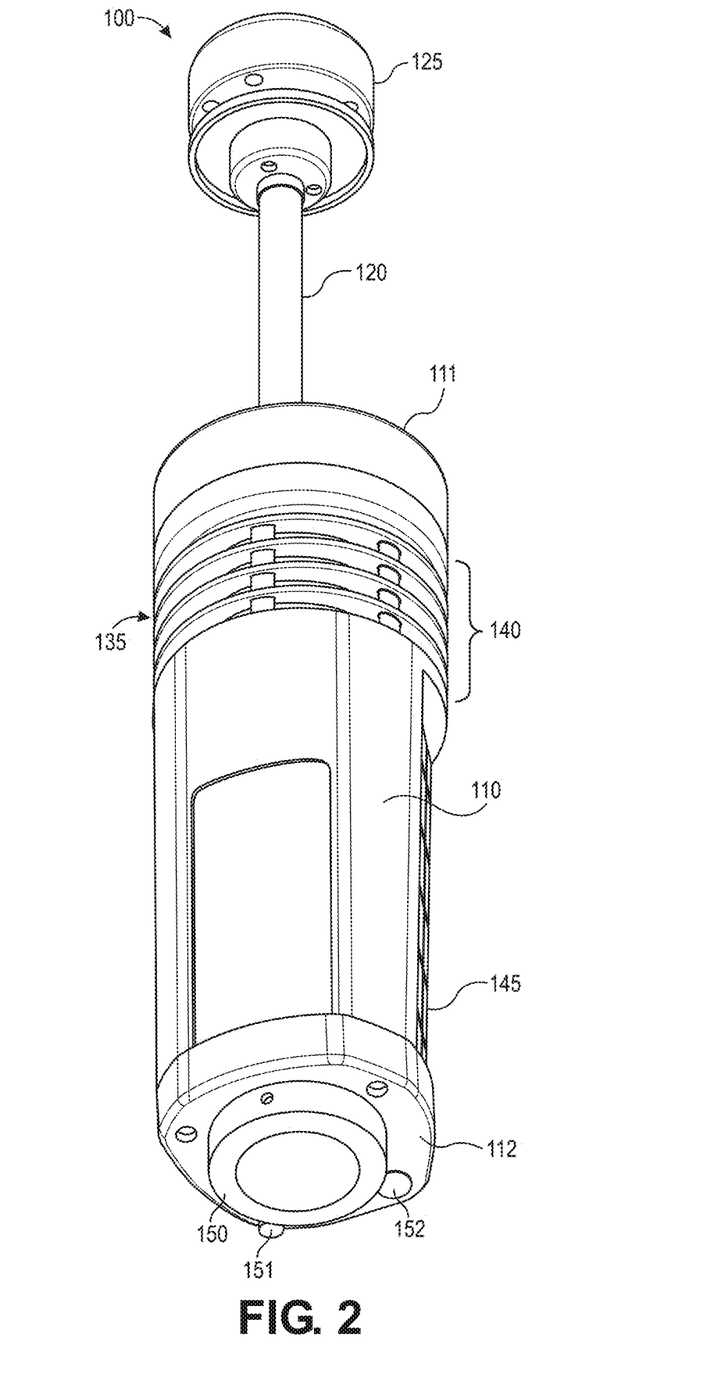
Figure 3:
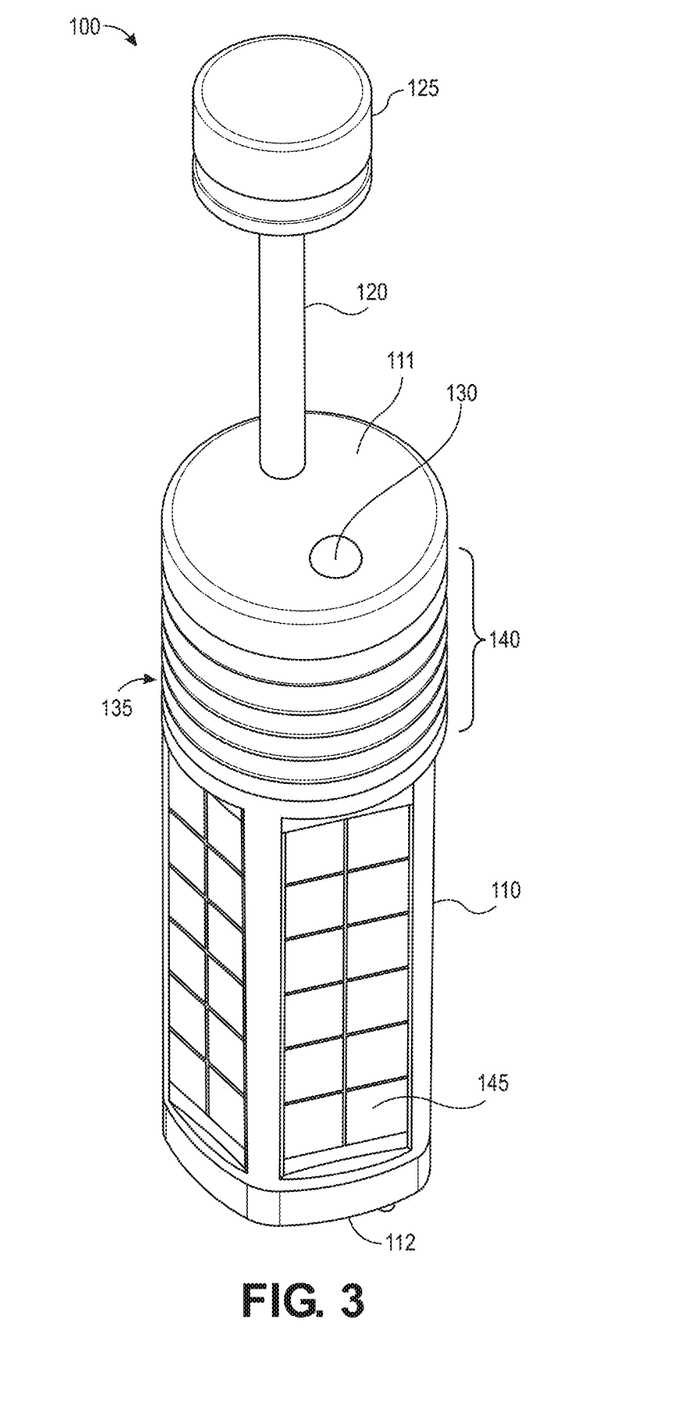
Figure 4:
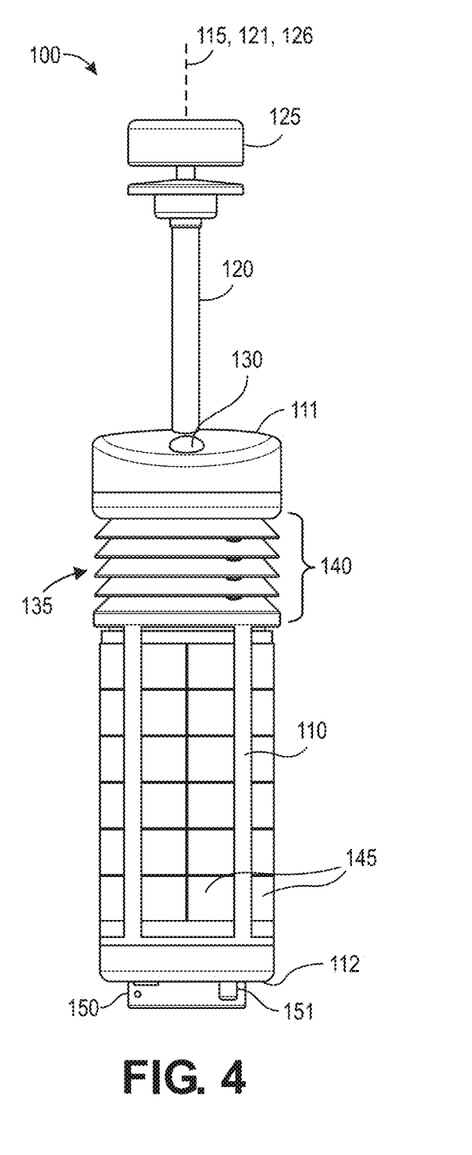
FIGS. 4-6 illustrate side views of the methane monitoring system, according to an embodiment.
Figure 5:
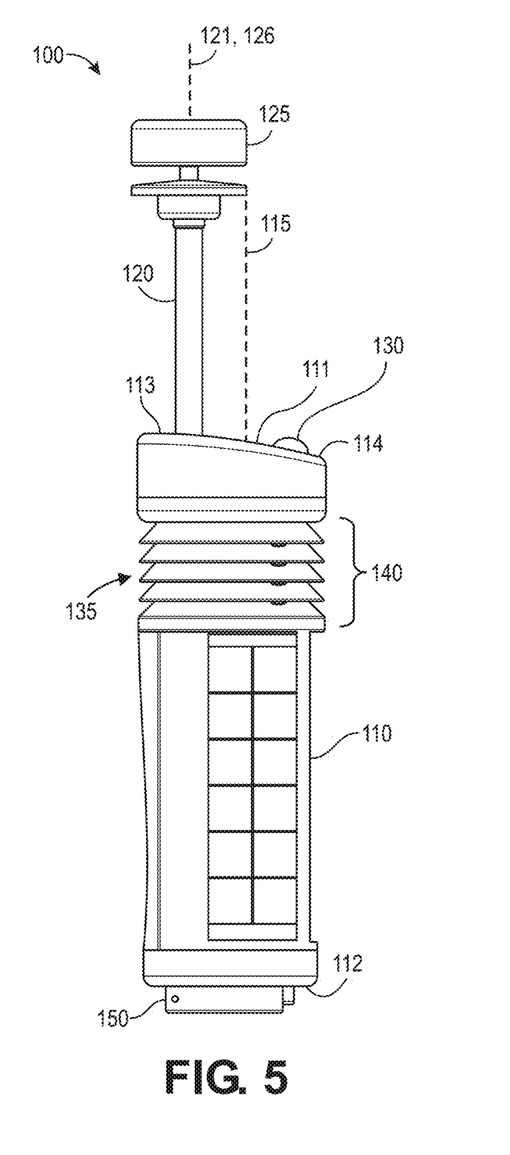
Figure 6:
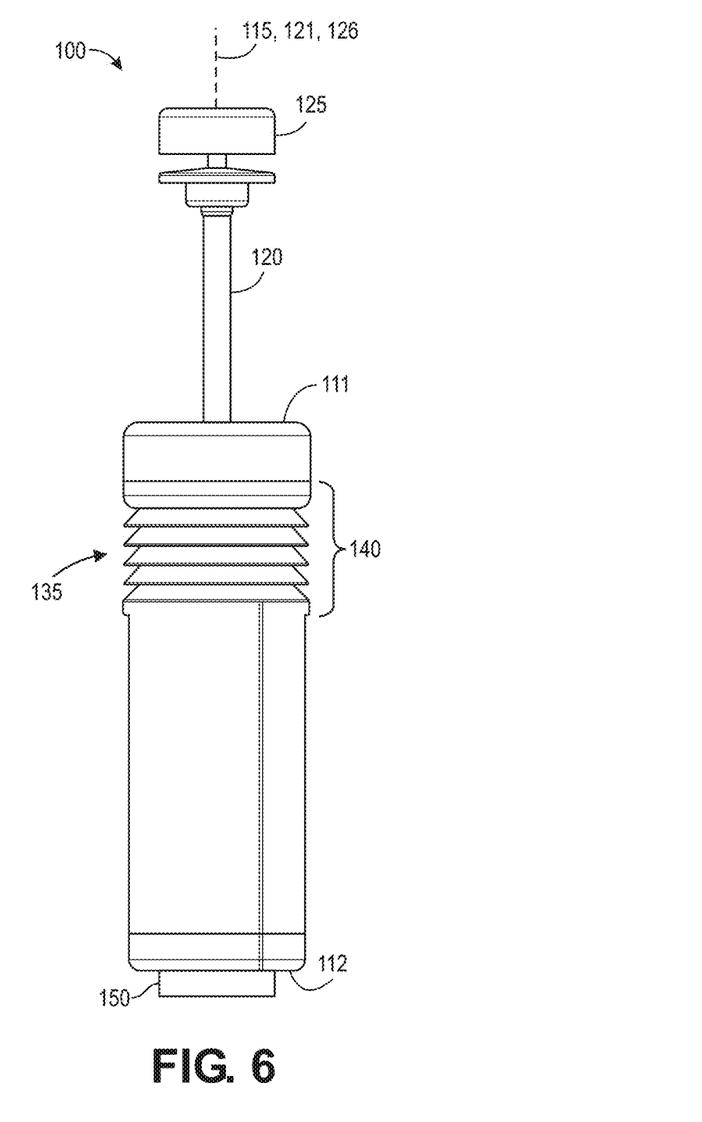

FIGS. 1-3 illustrate perspective views of a methane monitoring system 100, and FIGS. 4-6 illustrate side views of the system 100, according to an embodiment. The system 100 may be or include a fully integrated, autonomous, IoT-enabled, continuous, methane monitoring system. In one embodiment, the system 100 may be placed at a wellsite. For example, a plurality of systems 100 may be positioned along the perimeter of the wellsite.

As shown, the system 100 may include a body 110. The body 110 may be substantially cylindrical. The body 110 may be or include an enclosure that defines an internal volume. The body 110 may include a first (e.g., upper) axial end 111 and a second (e.g., lower) axial end 112. As shown in FIG. 5, the upper axial end 111 may have a first portion 113 and a second portion 114. The first portion 113 may extend farther (e.g., axially) than the second portion 114 with respect to a central longitudinal axis 115 through the body 102. The upper axial end 111 (e.g., the second portion 114) may be at least partially curved to avoid dust, rain, and/or snow accumulation.

The system 100 may also include a shaft 120. The shaft 120 may extend from the body 110. More particularly, the shaft 120 may extend from the from the upper axial end 111 of the body 110. For example, the shaft 120 may extend from the first portion 113 of the upper axial end 111. As shown in FIG. 5, a central longitudinal axis 121 through the shaft 120 may be parallel to and/or positioned radially-outward from the central longitudinal axis 115 through the body 110.

Figure 7:
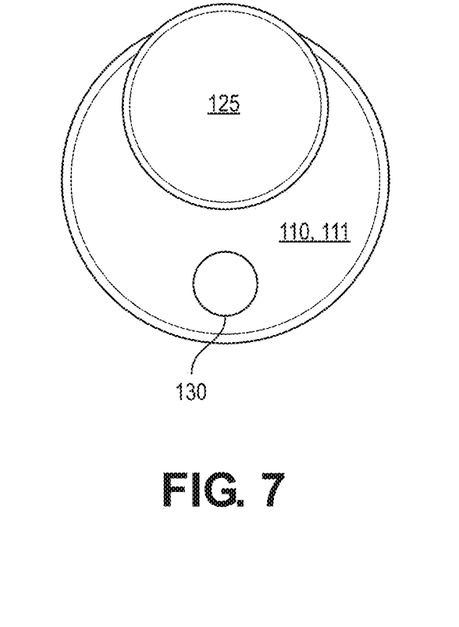
FIG. 7 illustrates a top view of the methane monitoring system, according to an embodiment.

FIG. 7 illustrates a top view of the methane monitoring system 100, according to an embodiment. Referring to FIGS. 1-7, the system 100 may also include a wind sensor 125. The wind sensor 125 may be coupled to an end of the shaft 120. The wind sensor 125 may be an ultrasonic wind sensor that is configured to measure a wind direction and/or a wind intensity. A central longitudinal axis 126 through the wind sensor 125 may be parallel to and/or aligned with the central longitudinal axis 121 through the shaft 120. The wind sensor 125 may include an upper portion and a lower portion. The ultrasonic sensor is part of the upper portion, and it transmits ultrasonic waves downward toward the lower portion. The waves reflect off of the lower portion back toward the upper portion. The wind and/or waves travel between the upper and lower portions, and the ultrasonic sensor measures the affected wave signal to determine wind direction and speed.

The system 100 may also include a pyranometer 130 coupled to the body 110. More particularly, the pyranometer 130 may be coupled to and/or positioned on the upper axial end 111 of the body 110. For example, the pyranometer 130 may be coupled to and/or positioned on the curved second (e.g., lower) portion 114 of the upper axial end 111. The pyranometer 130 may be positioned radially-outward from the central longitudinal axis 115 through the body 110. The pyranometer 130 may be positioned circumferentially-offset from the shaft 120 with respect to (e.g., around) the central longitudinal axis 115 through the body 110. The aforementioned positioning of the pyranometer 130 may prevent the shaft 120 and/or the wind sensor 125 from casting a shadow (e.g., from the sun) onto the pyranometer 130 at any time on any day of the year. The pyranometer 130 may include a high-sensitivity light sensor covered with a light diffuser. Thus, the pyranometer 130 may be configured to measure ambient light such as solar radiation. The pyranometer 130 may be substantially dome-shaped to reduce a cosine angle error of the ambient light due to the position of the sun. The pyranometer 130 may be or include polycarbonate.

The system 100 may also include a methane sensor 135 positioned on or in the body 110. The methane sensor 135 may be configured to measure a methane concentration in the ambient air. As described below, the measured methane concentration may then be used to detect the presence of a methane leak, the location of the methane leak, and/or the rate of the methane leak.

The system 100 may also include a solar shield 140 positioned at least partially around the body 110. More particularly, the solar shield 140 may be positioned around the methane sensor 135. The solar shield 140 may be or include a plurality of rings that are axially-offset from one another with respect to the central longitudinal axis 115 through the body 110. The rings may be spaced radially-outward from the methane sensor 135. The solar shield 140 may be configured to prevent the ambient light from the sun from affecting the methane concentration measured by the methane sensor 135.

The system 100 may also include a plurality of (e.g., three) solar panels 145 positioned on the body 110. The solar panels 145 may be axially-offset from (e.g., below) the solar shield 140 with respect to the central longitudinal axis 115 through the body 110. The solar panels 145 may be circumferentially-offset from one another with respect to the central longitudinal axis 115 through the body 110. The solar panels 145 may be positioned vertically when the system 110 is installed (e.g., to reduce snow and dust accumulation thereon). More particularly, the solar panels 145 may be placed vertically to provide efficient power output in latitudes close to the pole where sun is low on the horizon, and/or to avoid obfuscation due to snow/dust accumulation. The solar panels 145 may provide a visual reference to position the system 100 such that the solar panels 145 face south in the northern hemisphere while the wind sensor 125 faces north. The solar panels 145 may be configured to receive the ambient light from the sun.

Figure 8:
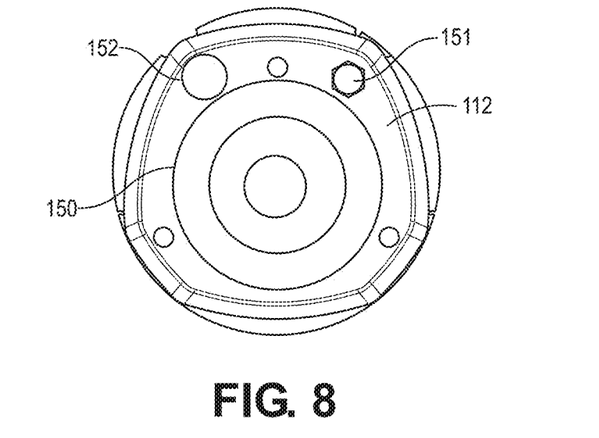
FIG. 8 illustrates a bottom view of the methane monitoring system, according to an embodiment.

FIG. 8 illustrates a bottom view of the methane monitoring system 100, according to an embodiment. Referring to FIGS. 1, 3, and 8, the system 100 may also include a mounting hole 150 positioned on and/or in the lower axial end 112. The mounting hole 150 may be used to mount the system 100 (e.g., the body 110) on a post.

The system 100 may also include a power port connector 151 positioned on the lower axial end 112. In an embodiment, the power port connector 151 may be connected to an external power supply, which may provide additional power to the system 100 (e.g., the battery 186).

The system 100 may also include a power button 152 positioned on the lower axial end 112. The power button 152 may be used to turn the system 100 on and off and/or to configure the system 100 into different setup modes. In one embodiment, the power button 152 may include a light-emitting diode (LED) that may indicate whether the system 100 is on or off and/or to indicate the setup mode of the system 100.

Figure 9:
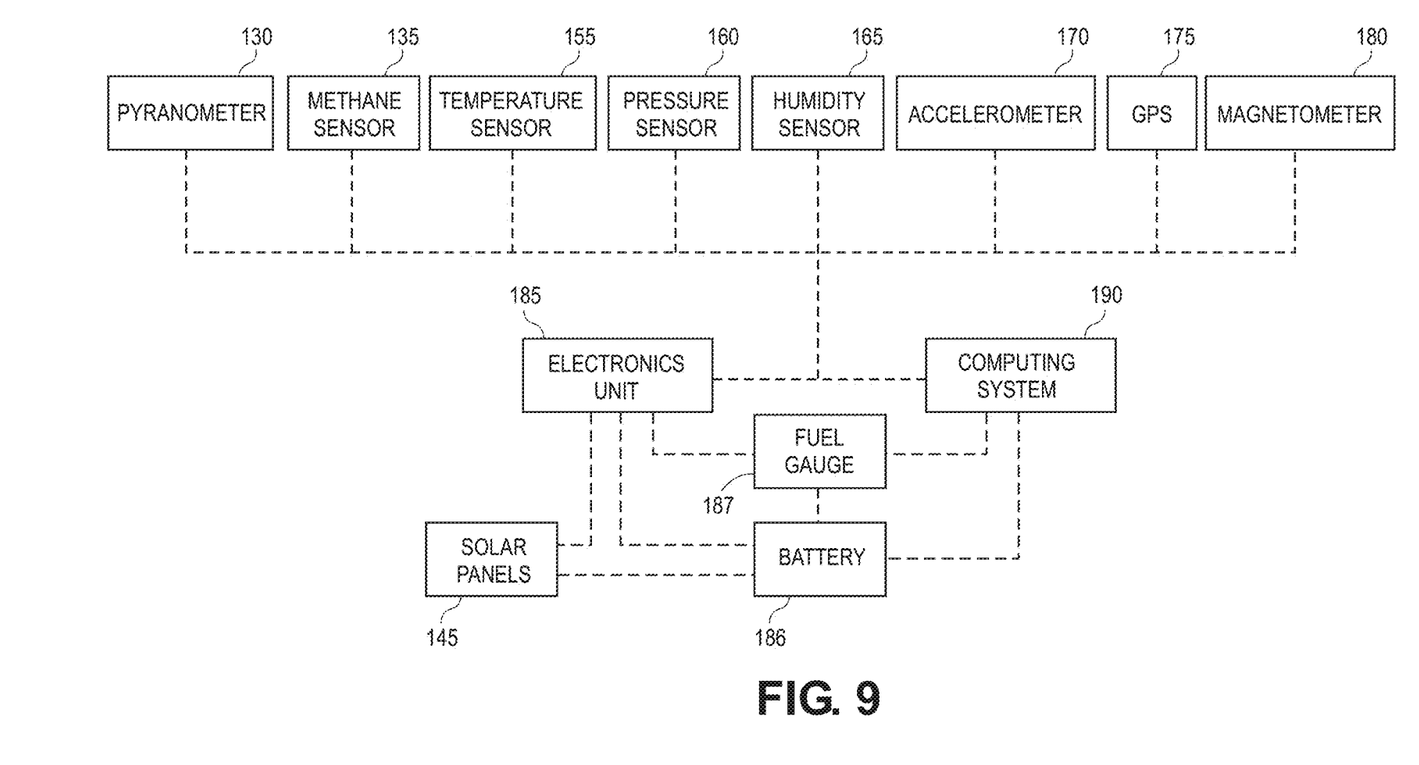
FIG. 9 illustrates a schematic view of an interior of the methane monitoring system, according to an embodiment.

FIG. 9 illustrates a schematic view of an interior of the body 110, according to an embodiment. The system 100 may also include a temperature sensor 155 positioned on or in the body 110. The temperature sensor 155 may be configured to measure a temperature of the ambient air. The measured temperature may then be used to perform compensations on the methane sensor 135 (e.g., the sensor is sensitive to temperature). In addition, having temperature tells the system 100 about the ambient conditions, which may be useful when troubleshooting.

The system 100 may also include a pressure sensor 160 positioned on or in the body 110. The pressure sensor 160 may be configured to measure an atmospheric pressure of the ambient air. The atmospheric pressure may then be used to determine a height of the system 100. The height may then be used to interpret methane models (e.g., the plume may not be constant vertically).

The system 100 may also include a humidity sensor 165 positioned on or in the body 110. The humidity sensor 165 may be configured to measure a humidity of the ambient air. The measured humidity may then be used to perform compensations on the methane sensor 135 (e.g., the sensor is sensitive to humidity). In addition, having humidity tells the system 100 about the ambient conditions, which may be useful when troubleshooting.

The system 100 may also include an accelerometer 170 positioned on or in the body 110. The accelerometer 170 may be configured to measure a tilt of the system 100. The measured tilt may then be used to detect if the system 100 has fallen to the ground. It also gives an indication of the quality of the installation. For example, if the wind sensor 125 is too tilted versus the vertical axis, it may not measure properly the wind properties. In this case, wind information of this particular system/instrument may be discarded, or the tilt may be adjusted.

The system 100 may also include a global positioning sensor (GPS) 175 positioned on or in the body 110. The GPS 175 may be configured to measure a location of the system 100. The measured location may then be used to interpret methane models (e.g., to determine the presence, location, and/or rate of a methane leak). More particularly, the model interpretation depends upon where each system 100 is located to determine the leak location based on a triangulation of wind directions. Location is also used below for determining if orientation is correct (e.g., location helps determining if installation is in northern or southern hemisphere).

The system 100 may also include a magnetometer 180 positioned on or in the body 110. The magnetometer 180 may be configured to measure an orientation of the system 100. The measured orientation may then be used during the installation of the system 100, to feedback directly to the installer where the system points. The solar panels 145 may face south in the northern hemisphere, and north in the southern hemisphere. In addition, the wind sensor 125 may be referenced to a target in order to know wind direction. The assumption is that the installer may install the system facing south (or north in the southern hemisphere) so that the wind sensor 125 may be referenced to north. If misaligned with north, once the orientation is measured, the system 100 can correct this offset.

The system 100 may also include an electronics unit 185 in the body 110. The electronics unit 185 may be configured to convert the ambient light received from the solar panels 145 into power for the system 100. The electronics unit 185 may be or include a modem that is configured to communicate (e.g., wirelessly) with a cloud over a cellular network.

The system 100 may also include a battery 186 in the body 110. The battery 186 may be configured to store the power (e.g., from the solar panels 145 and/or the electronics unit 185). The system 100 may also include a fuel gauge 187 in the body 110. The fuel gauge 187 may be configured to measure the status of the battery 186 (e.g., as a percentage).

The system 100 may also include a computing system 190. In one embodiment, the computing system 190 may be remote from the body 110. More particularly, the computing system 190 may be configured to communicate wirelessly with the electronics unit 180. For example, the computing system 190 may be a cloud computing system. In another embodiment, the computing system 190 may be coupled to the body 110 (e.g., the electronics unit 180). For example, the computing system 190 may be at least partially within the body 110. The computing system 190 may be configured to determine that a methane leak is present based upon the methane concentration, the wind direction, the wind intensity, or a combination thereof. The computing system 190 may also or instead be configured to determine a location of the methane leak based upon the methane concentration, the wind direction, the wind intensity, or a combination thereof. The computing system 190 may also or instead be configured to determine a rate of the methane leak based upon the methane concentration, the wind direction, the wind intensity, or a combination thereof.

The foregoing description, for purpose of explanation, has been described with reference to specific embodiments. However, the illustrative discussions above are not intended to be exhaustive or limiting to the precise forms disclosed.

Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A system for detecting methane, the system comprising:
   a body having an upper axial end and a lower axial end, wherein the upper axial end is at least partially curved, wherein the upper axial end has a first portion and a second portion, and wherein the first portion extends farther axially than the second portion;
   a shaft extending from the first portion of the upper axial end, wherein a central longitudinal axis through the shaft is parallel to and positioned radially-outward from a central longitudinal axis through the body;
   a wind sensor coupled to an end of the shaft, wherein the wind sensor is configured to measure a wind direction and a wind intensity, and wherein a central longitudinal axis through the wind sensor is aligned with the central longitudinal axis through the shaft;
   a pyranometer coupled to the second portion of the upper axial end, wherein the pyranometer is positioned radially-outward from the central longitudinal axis through the body, wherein the pyranometer is circumferentially-offset from the shaft with respect to the central longitudinal axis through the body, wherein the pyranometer is configured to measure ambient light, and wherein the ambient light comprises solar radiation;
   a methane sensor positioned on or in the body, wherein the methane sensor is configured to measure a methane concentration in ambient air;
   a temperature sensor positioned on or in the body, wherein the temperature sensor is configured to measure a temperature of the ambient air;
   a pressure sensor positioned on or in the body, wherein the pressure sensor is configured to measure an atmospheric pressure of the ambient air, which is used to determine a height of the system;
   a humidity sensor positioned on or in the body, wherein the humidity sensor is configured to measure a humidity of the ambient air;
   an accelerometer positioned on or in the body, wherein the accelerometer is configured to measure a tilt of the system;
   a global positioning sensor (GPS) positioned on or in the body, wherein the GPS is configured to measure a location of the system; and
   a magnetometer positioned on or in the body, wherein the magnetometer is configured to measure an orientation of the system.

2. The system of claim 1, wherein the pyranometer is positioned such that neither the shaft nor the wind sensor will cast a shadow from the sun onto the pyranometer at any time on any day of the year.

3. The system of claim 1, wherein the pyranometer comprises polycarbonate.

4. The system of claim 1, wherein the pyranometer is substantially dome-shaped to reduce a cosine angle error of the ambient light due to a position of the sun.

5. The system of claim 1, further comprising a solar shield positioned at least partially around the body, wherein the solar shield is positioned around the methane sensor, wherein the solar shield comprises a plurality of rings that are axially-offset from one another with respect to the central longitudinal axis through the body, wherein the rings are spaced radially-outward from the methane sensor, and wherein the solar shield is configured to prevent the ambient light from the sun from affecting the methane concentration measured by the methane sensor.

6. The system of claim 5, further comprising a plurality of solar panels positioned on the body, wherein the solar panels are axially-offset from the solar shield with respect to the central longitudinal axis through the body, wherein the solar panels are positioned vertically when the system is installed to reduce snow and dust accumulation thereon, wherein the solar panels provide a visual reference to position the system such that the solar panels face south in the northern hemisphere while the wind sensor is oriented north, and wherein the solar panels are configured to receive the ambient light from the sun.

7. The system of claim 6, further comprising:
   an electronics unit in the body that is configured to convert the ambient light received from the solar panels into power for the system, wherein the electronics unit comprises a modem that is configured to communicate with a cloud over a cellular network;
   a battery in the body that is configured to store the power;
   a mounting hole positioned in the lower axial end to mount the body on a post;
   a power port connector positioned on the lower axial end, wherein the power port connector is configured to receive additional power for the system;
   a power button positioned on the lower axial end to turn the system on and off and to configure the system into different setup modes; and
   a light-emitting diode (LED) integrated into the power button to indicate whether the system is on or off and to indicate the setup mode of the system.

8. The system of claim 1, further comprising a computing system configured to:
   determine that a methane leak is present based upon the methane concentration, the wind direction, and the wind intensity;
   determine a location of the methane leak based upon the methane concentration, the wind direction, and the wind intensity; and
   determine a rate of the methane leak based upon the methane concentration, the wind direction, and the wind intensity.

* * * * *